United States Patent [19]
Raman et al.

[11] Patent Number: 5,832,231
[45] Date of Patent: Nov. 3, 1998

[54] METHOD AND SYSTEM FOR PRELOADING INTERACTIVE MULTIMEDIA APPLICATIONS

[75] Inventors: Prabhu Raman, Broomfield; Peter J. Welter, Boulder, both of Colo.

[73] Assignee: U S WEST, Inc., Englewood, Colo.

[21] Appl. No.: 915,188

[22] Filed: Aug. 20, 1997

Related U.S. Application Data

[63] Continuation of Ser. No. 372,152, Jan. 13, 1995, abandoned.

[51] Int. Cl.$^6$ .............................. G06F 13/38; G06F 15/17
[52] U.S. Cl. .............................. 395/200.64; 395/200.48; 395/200.61; 345/327
[58] Field of Search .................. 395/200.01, 200.05, 395/200.06, 200.09, 200.17, 464, 467, 200.3, 200.48, 200.64, 200.61, 200.49, 200.38, 200.55, 200.59, 200.66; 345/327; 711/137, 140, 204

[56] References Cited

U.S. PATENT DOCUMENTS

| | | | |
|---|---|---|---|
| 5,289,581 | 2/1994 | Berenguel et al. ..................... | 395/275 |
| 5,305,389 | 4/1994 | Palmer ........................................ | 382/1 |
| 5,317,727 | 5/1994 | Tsuchida et al. ...................... | 395/600 |
| 5,361,391 | 11/1994 | Westberg ................................ | 395/425 |
| 5,452,447 | 9/1995 | Nelson et al. ........................... | 395/650 |
| 5,515,518 | 5/1996 | Stiles et al. ............................. | 395/375 |
| 5,537,546 | 7/1996 | Sauter ................................ | 395/200.01 |
| 5,551,001 | 8/1996 | Cohen et al. ........................... | 395/449 |
| 5,553,254 | 9/1996 | Berstis et al. ........................... | 395/375 |
| 5,557,767 | 9/1996 | Sukegawa ............................... | 395/440 |
| 5,566,324 | 10/1996 | Kass ........................................ | 395/487 |

*Primary Examiner*—Mark H. Rinehart
*Attorney, Agent, or Firm*—Brooks & Kushman P C

[57] ABSTRACT

A method is disclosed for preloading prefetch data of a multimedia application at a client station in an interactive network. The method begins with the step of transmitting a first signal from a server to the client station representing a composite description. The method next includes the step of storing the composite description in the client memory. The client station identifies prefetch data based on the composite description. The client station then transmits a signal to the server requesting the identified prefetch data. Finally, the server transmits the prefetch data to the client station where it is stored. A system is also disclosed for implementing the steps of the method.

8 Claims, 3 Drawing Sheets

METHOD AND SYSTEM FOR PRELOADING INTERACTIVE MULTIMEDIA APPLICATIONS

This is a continuation of application Ser. No. 08/372,152 filed on Jan. 13, 1995, abandoned.

CROSS-REFERENCE TO RELATED APPLICATIONS

This application is related to copending U.S. patent application Ser. Nos. 08/372,153, 08/372,159, 08/372,158 and 08/372,157, filed concurrently with the present application, respectively entitled Method For Automatically Collecting and Delivering Application Event Data in an Interactive Network, "Method and System for Describing an Interactive Multimedia Application", "Method and System for Developing Interactive Multimedia Applications" and Method and System for Managing Multimedia Assets for Proper Deployment on Interactive Networks which are commonly assigned to the assignee of the present application, and which are hereby incorporated by reference.

TECHNICAL FIELD

This invention relates generally to methods for executing multimedia applications on an interactive network.

BACKGROUND ART

Recently, interactive networks, including broadband television and computer networks, are being deployed at a rapid pace. This increase in the number of interactive networks has created a need for the rapid development of accompanying multimedia applications to be executed on such networks.

Traditionally, multimedia applications have either been permanently deployed at a client station or downloaded from a network server. These prior art methods of loading applications can result in substantial network latency.

DISCLOSURE OF THE INVENTION

In view of the prior art, a need exists for a method and system for more efficiently loading multimedia applications which may be executed at a client station.

It is an object of the present invention to provide a method and system for preloading segments of a multimedia application which results in reduced response time.

In carrying out the above objects and other objects of the present invention, a method is provided for preloading prefetch data of a multimedia application at a client station. The method is performed using an interactive network including a server and a client station. The server includes a composite description, a plurality of composites and a plurality of application assets stored in a memory.

The client station includes a processor, a client memory and preloading control logic stored in the client memory. The method begins with transmitting a first signal from the server to the client station representing the composite description.

The method includes storing the composite description in the client memory. Next, prefetch data is identified at the client station based on the composite description.

A signal is then transmitted from the client station to the server representing a request for the identified prefetch data. The server responds by transmitting a signal to the client station representing the requested prefetch data. Finally, the prefetch data is stored at the client station.

In further carrying out the above objects and other objects of the present invention, a system is also provided for carrying out the above described method.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein.

BEST MODES FOR CARRYING OUT THE INVENTION

Figure 1:
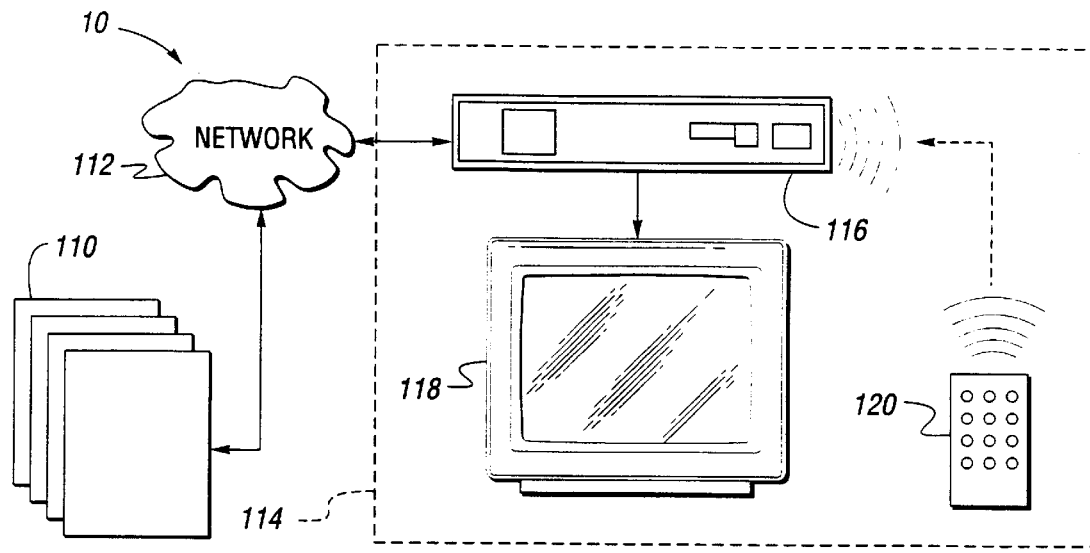
FIG. 1 is a schematic block diagram of the environment in which the present invention is used.

Referring now to the drawings, FIG. 1 is a schematic block diagram illustrating an interactive television ("ITV") system 10 for use with the present invention. System 10 includes at least one ITV server 110 for use with an ITV network 112. ITV server 110 is connected through ITV network 112 with client station 114.

There are a number of equipment manufacturers who produce commercially available equipment which could function as ITV server 110. In fact, the control logic employing the method of the present invention has been successfully implemented on DEC Alpha AXP processors running DEC OSF/1; SGI mips-based processors running IRIX; and SUN processors running SunOS.

The control logic has been implemented in both C and C++. If necessary, it could be easily ported to other UNIX platforms.

Client station 114 includes set top terminal 116, television 118 and remote controller 120. Preferably, set top terminal 116 would be either a Time-Warner full service network Home Communications Terminal ("HCT") or a 3DO set top terminal. The Time Warner HCT employs a MIPS R4000 chip running at 80–100 Mhz and incorporates Silicon Graphics Indigo Workstation components.

The 3DO set top terminal employs a proprietary 3DO chip set. The control logic communicating with the 3DO set top terminals conform to the 3DO RPC Folio, as described in the "3DO Network Developer's Guide—Preliminary Draft", dated July, 1994.

Both terminals, Time Warner and 3DO, are capable of receiving digital full-motion video, animation, graphics and audio data. Both terminals are further capable of converting this digital information into an analog signal for transmission to television 118.

Client station 114 further includes an input device 120. Preferably input device 120 is an infrared remote control including a number of alpha-numeric keys. Alternatively, input device 120 could be an infrared mouse.

As those skilled in the art will recognize, system 10 is an interactive television network employing a client-server architecture. ITV server 110 provides mass storage and services to client station 114. Control logic resides at both server 110 and client station 114 to support the client-server architecture.

Although the preferred server 110 and client station 114 are part of an interactive television system, the present invention is not limited to such an embodiment. For example, client station 114 could be a kiosk or personal computer without adversely affecting the utility of the present invention.

Figure 2:
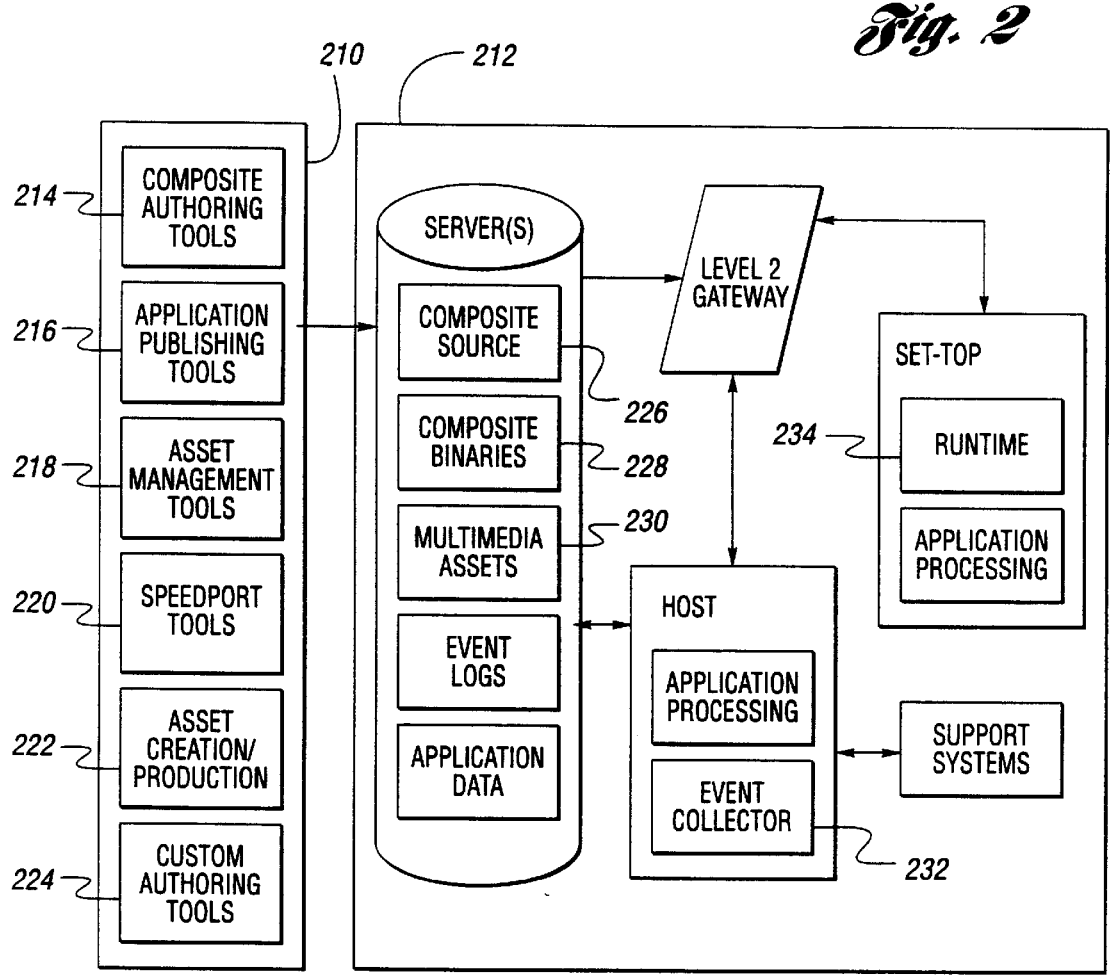
FIG. 2 is a schematic block diagram illustrating the preferred architecture of an interactive television network employing the development method of the present invention.

Referring now to FIG. 2, there is shown a schematic block diagram illustrating the architecture of the Information Services Infra-Structure ("ISIS") employing the application development method of the present invention. ISIS provides a set of interoperable software tools for developing and executing interactive multimedia applications for delivery on a variety of consumer electronic devices over a variety of broadband networks.

The ISIS architecture includes two categories of software components: development components 210 and runtime components 212. Development components 210 include authoring and application publishing tools for building a multimedia application.

The authoring tools work with existing asset creation and production tools such as Adobe Photoshop, Adobe Premier, and SoundEdit Pro which can be used to create videos, graphics, audio, and fonts. An authored application can be compiled and tested in either a standalone Macintosh configuration or a client/server environment over a network. The application publishing tools move the application from a standalone environment to a server environment and to the eventual deployment/production environment.

The ISIS Runtime components 212 are responsible for executing an authored application. ISIS runtime 212 provides the execution environment for the application in a client/server environment where the client device is a consumer set top terminal. In order to support emerging consumer set top terminals, as well as Macintoshes and PCs, the developed applications are portable.

The initial focus of ISIS was to deliver 3DO Runtime software for the U S WEST Broadband network trial in Omaha, Nebr., in the fourth quarter of 1994. A Macintosh version of the runtime components is also supported to allow testing of applications without expensive 3DO or DEC development hardware and software.

Composite Authoring Tool (CAT)

Figure 3:
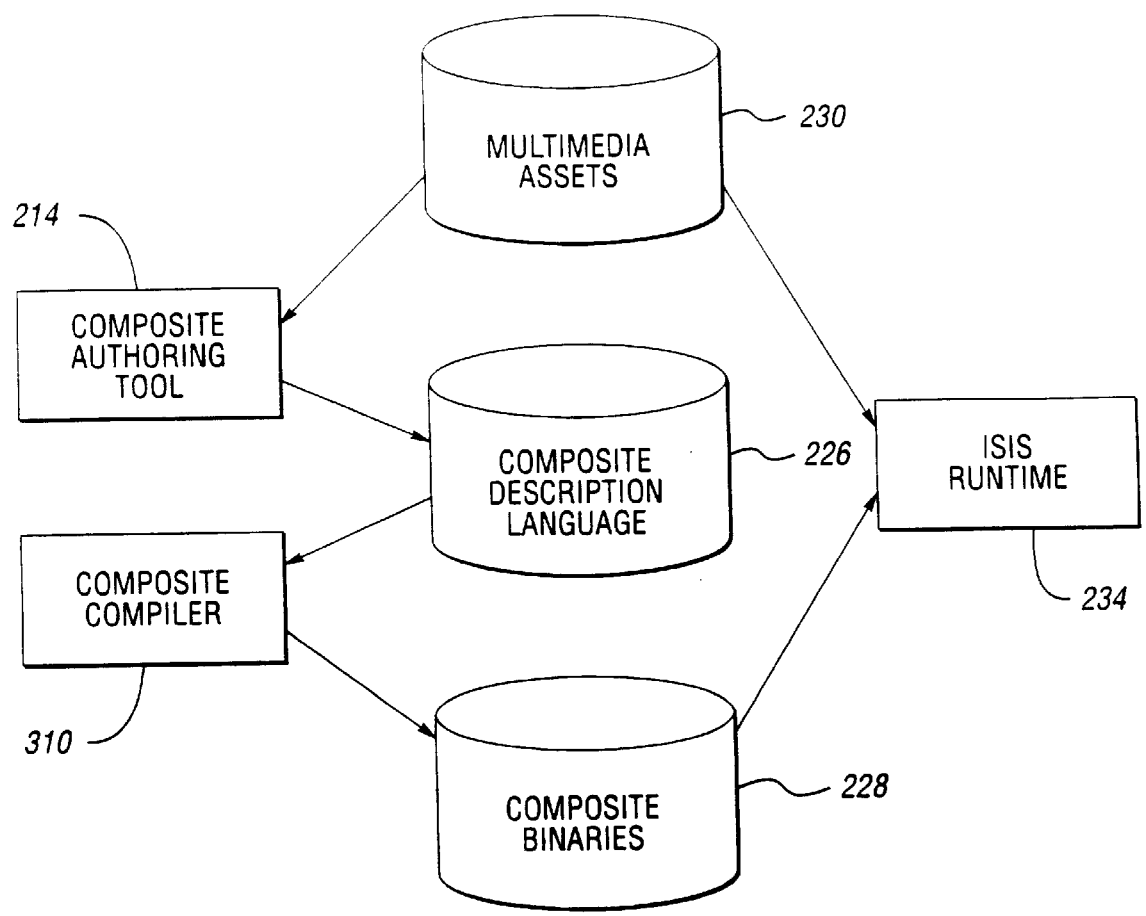
FIG. 3 is a schematic block diagram illustrating the relationship between various file formats and the runtime component of a set top terminal.

Referring now to FIG. 3, there is illustrated the relationship between CAT 214, Composite Compiler 310, various file formats and the ISIS runtime component 234 of set top terminal 114. CAT 214 is an authoring tool that runs on the Macintosh and defines the compositing of multimedia assets (i.e. video, graphics, audio, and text) into interactive multimedia applications. CAT 214 provides an integrated graphical layout editor, a forms editor, and a testing environment.

With the layout editor, display objects can be easily defined and laid out in a window that represents a television screen. Each display object also has a detail forms window in which additional object attributes can be specified.

CAT 214 provides a seamless testing environment on the Macintosh which is integrated with a composite compiler and the Macintosh version of the Runtime. CAT 214 invokes composite compiler 310 to compile the composite, and then invokes ISIS runtime 234 to execute the composite. A new composite can be created and tested with a few clicks of the mouse.

CAT 214 delivers a source composite definition 226 and a binary composite definition 228 as output in composite description Language ("CDL"). CDL provides an event driven, object oriented syntax for defining a multimedia application.

CDL source is stored in ASCII format, which makes it easy to read by any program that can read ASCII text files. CDL source files can be generated by CAT and edited by custom built authoring tools or any editor capable of handling ASCII text files.

Composite compiler 310 converts CDL from a source format into a more compact binary format. ISIS runtime 234 then reads and executes the instructions of the application in this binary format.

Composite compiler 310 includes a composite optimizer which condenses multiple composite files and assets referenced by the composite to a single composite binary file. Reducing the number of physical files within the application reduces the number of file accesses the ISIS Runtime must perform to execute a composite. File accesses are expensive, especially in a network environment because of network latency.

Composites, composite items, events, actions, and templates are the building blocks of CDL and any application built in ISIS.

Composite A composite is a collection of assets, events and actions assembled into a "scene" that the ISIS Runtime 212 plays back. Composites can also contain other composites. To describe interactivity, a composite defines how to handle external events such as button presses on a remote control.

Composite item A composite item is a multimedia object (i.e. video, graphic, text, audio, animation or custom library) within a composite. Attributes such as screen location, transparency and audio and video looping further define composite items.

Event An event is an occurrence to which an application must react. Events can occur externally or internally to the ISIS Runtime. Button presses on a remote control are external events. The passage of time, entering a composite and starting a stream are internal events. As ISIS Runtime 212 plays back a composite, it also monitors events as they occur. When an event occurs that is of interest to the executing composite, the ISIS Runtime 212 executes the actions associated with that event. An event always has at least one action associated with it.

Action CDL has predefined actions that the ISIS Runtime player can perform. For example, a common action for composite items is "enable." The enable action tells the ISIS Runtime to display a graphic, play an audio file, etc. Another common action is "transition to:composite" which tells the ISIS Runtime to execute the composite defined by the "transition to" action. In effect, these transitions link composites together into an application. In addition to the predefined actions that ISIS provides, a developer can write and add custom actions.

Composite Templates Composites can also be templates. Any composite can take its composition from another composite simply by referencing that composite as a template. Composites inherit (using a delegation mechanism) all items, events, and actions from a template.

Application Publishing

The ISIS application publishing tools 216 are utilities that move an application between test environments and the deployment environment. These tools move all the objects of an ISIS application including composites, video, graphic and audio files, fonts, and custom code.

Application publishing tools 216 examine composite descriptions, determine all the files that support the composites, and move the application to a staging area such as tape or disk. From the staging area, the application can be moved to a variety of environments.

ISIS also supports incremental publishing. Using incremental publishing, only those objects that have been altered since the last publishing of the application are moved. This lets the developer add new features and change content quickly.

Asset Management and Production System (AMPS)

The ISIS Asset Management and Production System (AMPS) 218 provides a set of tools for managing multimedia assets 230 and ISIS applications. AMPS 218 provides multimedia title developers with an easy and convenient way to catalog assets, perform keyword searches on assets, archive assets and publish applications. AMPS 218 moves applications and assets from the development environment to the deployment environment.

Figure 4:
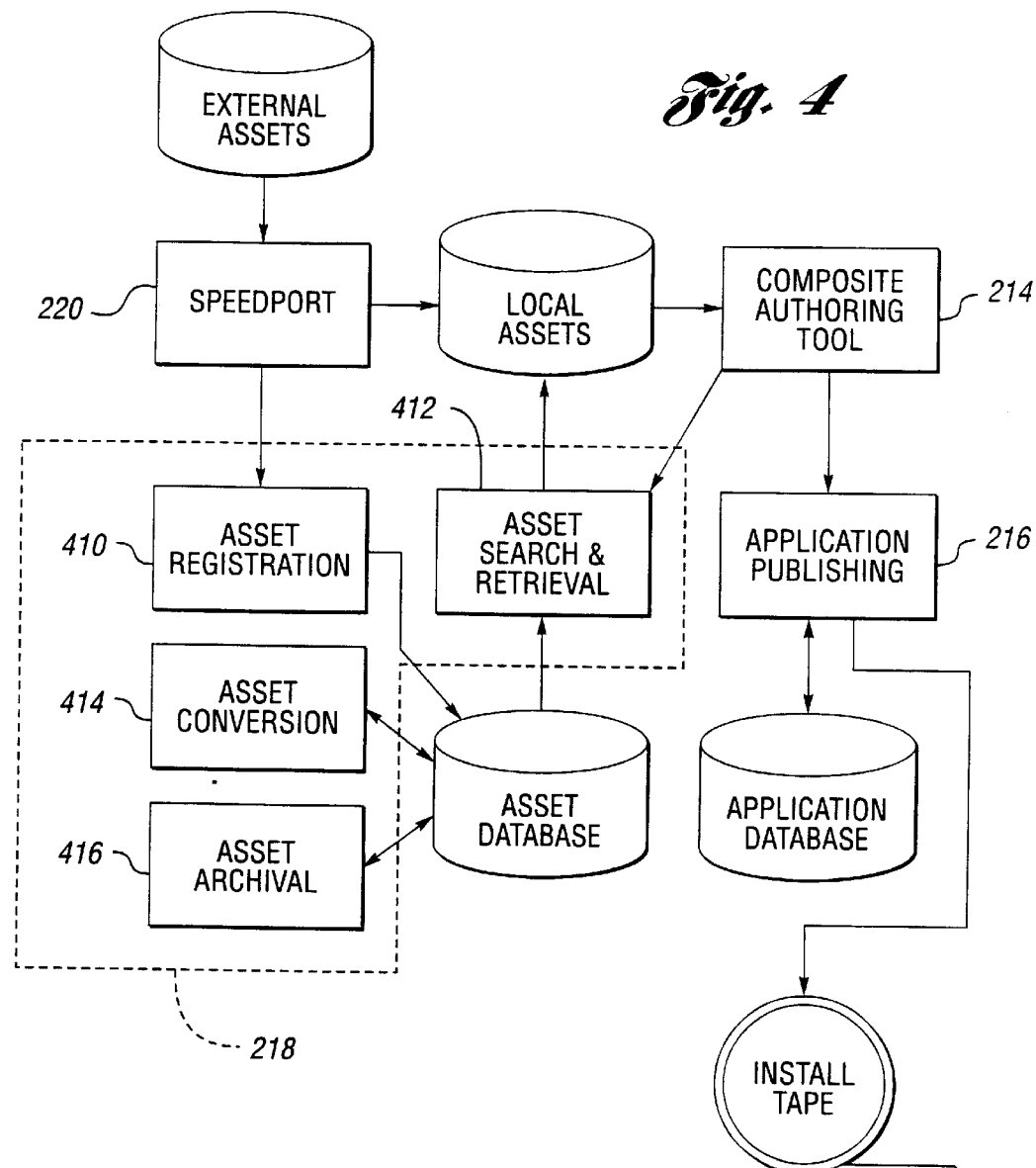
FIG. 4 is a functional block diagram illustrating the relationship between components of the Asset Management and Production System of the preferred embodiment.

Referring now to FIG. 4, there is a functional block diagram illustrating the relationship between components of AMPS 218 of the preferred embodiment.

Asset Registration

Asset registration 410 allows the developer to identify and catalog an asset or group of assets with AMPS 218. The developer can also assign keywords to the asset during the registration process. The developer can register assets manually using asset registration screens. Speedport 220 also uses the asset registration function to allow the developer to register assets in an automated fashion.

Asset Search and Retrieval

The asset search and retrieval function 412 allows the developer to perform keyword searches of the asset database. Asset retrieval supports the browsing of assets and/or using the asset within a multimedia application. CAT 214 integrates with the asset search and retrieval function 412, providing the developer an easy and convenient way to locate assets during the authoring process.

Asset Conversion

Multimedia assets come in many different formats. The ISIS asset conversion tools 414 convert assets from one format to another as specified to the conversion process. A wide variety of formats are supported, including virtually all of the more commonly used formats today.

In general, the runtime platform requires assets to be in a certain format. For example, 3DO supports a format unique to the 3DO environment, called a CEL. The asset conversion tools 414 convert assets from a wide variety of formats into 3DO CELS.

Conversions can be run against a single asset or in batch against multiple assets. The converted asset is automatically registered with AMPS 218 as a new version.

Asset Archival

Asset archival 416 performs backup and recovery of assets. Asset archival 416 also moves assets off of faster magnetic disk devices to slower devices such as magnetic tape.

The archival of assets to slower devices provides significant cost benefits while still making the asset available to users of the system. Users are still able to perform keyword searches and view thumbnails on the archived asset. If the user wants to use the archived asset and it has been archived to a mounted device, AMPS 218 copies the asset back to disk. Otherwise, AMPS 218 notifies the user as to the location of the asset.

AMPS 218 also performs backup and recovery of assets to magnetic tape allowing the user to recover a previous version of an asset or restore an asset which may have been accidentally deleted.

Speedport Tools

Speedport 220 is a component of the ISIS tool set that transforms existing multimedia applications into ISIS applications. Speedport 220 provides tools to systematically extract multimedia assets from existing titles and to register those assets with AMPS. Speedport 220 also provides a methodology and practical guidance for converting the application into an ISIS application.

Speedport 220 speeds up the conversion of any existing multimedia application. Speedport 220 accepts a variety of digital media including CD-ROM, magnetic disk, optical drives, and digital tape.

Speedport 220 also defines a methodology or set of practices for porting application to the ISIS environment. This methodology guides the developer through the steps of moving application components from the existing environment into ISIS.

When performing asset extraction, Speedport 220 first searches the existing application and identifies multimedia assets from the set of files input to Speedport 220. This includes a variety of graphic, audio, and video file formats.

Next, Speedport 220 Converts and renames the assets into a format usable by CAT 214 and the Macintosh runtime module. Speedport 220 then registers both the source and converted asset with AMPS 218. Finally, Speedport 220 generates reports identifying assets extracted by type and a list of unknown types.

The ISIS development environment 210 finally includes an interface to standard facilities such as asset creation/production 222 and custom authoring tools 224.

ISIS Runtime

A major component of the ISIS runtime environment 212 is the ISIS runtime module 234 which resides at client station 114. ISIS runtime 234 reads and plays back composite binary files 228 defined during the authoring process. It reads the startup composite, waits for events to occur, and then executes the actions associated with those events.

There are three major processing components of ISIS runtime module 234: the player; the preloader and the event collector.

As the heart of the Runtime, the player handles the display and playback of composite items, monitors and handles events as they occur, performs actions, and communicates with the preloader and event collector as needed.

The preloader provides the ISIS runtime 234 with an overall memory management and caching scheme whose purpose is to improve performance and to hide latency. The preloader manages both composites and assets. Assets can be either streamed or non-streamed. A non-streamed asset is loaded in its entirety from a server. A streamed asset may be loaded in segments.

The preloader module works in conjunction with a client application and loads composites and non-streamed assets from a server to the client before they are needed by the application. This reduces and in some cases eliminates the application latency where the client application has to wait for the composite or asset to be loaded from the server. The server may be remotely connected to the client over a network or they may even be on the same machine.

Each composite contains a description of all composites and non-streamed assets, collectively referred to as prefetch data, that need to be prefetched. The preloader uses this information to prefetch composites and assets. If a composite or asset is already loaded, either by the application or the preloader, then it is not loaded again from the server.

In the preferred embodiment, the preloader performs one level of look ahead, which means that it attempts to load all the prefetch data of the current composite and the prefetch data of each prefetched composite. In theory, the preloader can work with fewer or more levels of look ahead.

The preloader can run in the same execution thread as the application or it can run as a separate thread if the underlying operating system supports multiple threads. In an operating system that supports multiple processes, the preloader can even be a separate process. The preloader synchronizes with the application so that it does not try to load a composite or asset that is in the process of being loaded by the application.

The preloader works with bundled composites and assets, where a request for a single composite or asset from the client results in several composites and assets being sent from server to client. The extra composites and assets are remembered as being prefetched.

When an application starts and the player invokes the first composite, the preloader retrieves all of the files necessary to play the composite. It then looks at the composite and loads the "next" composites based on the transitions defined in the composite that is playing.

The event collector stores all internal and external events, as they occur, in a buffer in memory at client station 114. These events can be sent to the event collector 232 on the server for logging to a file or for additional processing.

The event collector captures the event information in enough detail so that ISIS Runtime 234 can use the event logs to play back an application session exactly as it appeared to the end user. ISIS runtime 234 is both compact and portable. Currently the total size of ISIS runtime 234 is approximately 200 KB.

Figure 5:
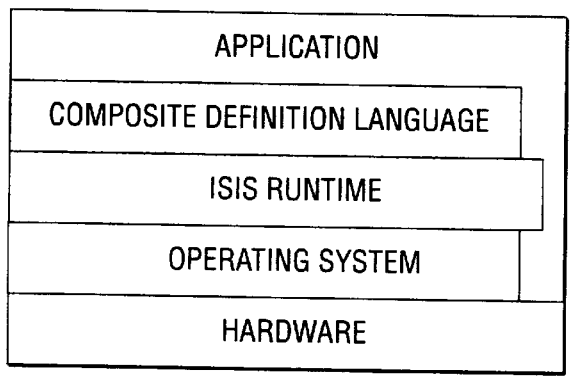
FIG. 5 is a block diagram illustrating the layered architecture employed by the preferred embodiment.

Applications developed using the ISIS development environment 210 are easy to port to any client station equipped with ISIS runtime 234. ISIS accomplishes this by providing the layered architecture shown in FIG. 5.

Applications written in CDL are hidden from the details of the hardware, operating system software, and ISIS runtime. Even if ISIS runtime running on a client station with which the developer is unfamiliar, the CDL portion of the application runs without any changes.

There are other pieces of the application, however, that might require changes in order to execute on different client stations. The changes might include reformatting and re-encoding assets and converting fonts.

While the best mode for carrying out the invention has been described in detail, those familiar with the art to which this invention relates will recognize various alternative designs and embodiments for practicing the invention as defined by the following claims.

What is claimed is:

1. In an interactive network including a server and a client station, the server including a server memory for storing a composite description, a plurality of composites, and a plurality of multimedia application assets, the client station including a client memory, a method for preloading prefetch data of a multimedia application at the client station to reduce network latency, the method comprising:

transmitting a first signal from the server to the client station representing a composite description, wherein the composite description describes prefetch data of a composite;

storing the composite description in the client memory;

identifying at the client station the prefetch data based on the composite description when the composite is running on the multimedia application at the client station, wherein the prefetch data includes at least one of the plurality of composites and multimedia application assets;

transmitting a second signal from the client station to the server representing a request for the identified prefetch data;

transmitting a third signal from the server to the client station representing the identified prefetch data before the multimedia application needs the identified prefetch data to run a composite following the composite currently running; and storing the prefetch data in the client memory before the multimedia application needs the identified prefetch data.

2. The method of claim 1 wherein the at least one of the plurality of multimedia application assets is a non-streamed multimedia application asset.

3. The method of claim 1 wherein identifying is based on one level of look-ahead.

4. The method of claim 1 wherein identifying includes identifying prefetch data loaded by the multimedia application, wherein transmitting a second signal representing a request for the identified prefetch data excludes a request for the prefetch data loaded by the multimedia application.

5. In an interactive network including a server and a client station, the server including a server memory for storing a composite description, a plurality of composites, and a plurality of multimedia application assets, the client station including a client memory, a system for preloading prefetch data of a multimedia application at the client station to reduce network latency, the system comprising:

means for transmitting a first signal from the server to the client station representing a composite description, wherein the composite description describes prefetch data of a composite;

means for storing the composite description in the client memory;

means for identifying at the client station the prefetch data based on the composite description when the composite is running on the multimedia application at the client station, wherein the prefetch data includes at least one of the plurality of composites and multimedia application assets;

means for transmitting a second signal from the client station to the server representing a request for the identified prefetch data;

means for transmitting a third signal from the server to the client station representing the identified prefetch data before the multimedia application needs the identified prefetch data to run a composite following the composite currently running; and means for storing the prefetch data in the client memory before the multimedia application needs identified the prefetch data.

6. The system of claim 5 wherein the at least one of the plurality of multimedia application assets is a non-streamed multimedia application asset.

7. The system of claim 5 wherein the means for identifying is based on one level of look-ahead.

8. The system of claim 5 wherein the means for identifying includes means for identifying prefetch data loaded by the multimedia application, wherein means for transmitting a second signal representing a request for the identified prefetch data excludes a request for the prefetch data loaded by the multimedia application.

* * * * *

UNITED STATES PATENT AND TRADEMARK OFFICE
CERTIFICATE OF CORRECTION

PATENT NO. : 5,832,231

DATED : November 3, 1998

INVENTOR(S) : Prabhu Raman; Peter J. Welter

It is certified that error appears in the above-identified patent and that said Letters Patent is hereby corrected as shown below:

On the title page, [54] and in col.1, lines 1-3:

Please revise title to read: "METHOD AND SYSTEM FOR PRELOADING PREFETCH DATA OF A MULTIMEDIA APPLICATION IN AN INTERACTIVE NETWORK Signed and Sealed this Fourth Day of May, 1999

*Attest:*

Q. TODD DICKINSON

*Attesting Officer*     *Acting Commissioner of Patents and Trademarks*